United States Patent [19]
Mansouri

[11] Patent Number: 5,799,812
[45] Date of Patent: Sep. 1, 1998

[54] COLLAPSIBLE SHIPPING CONTAINER

[76] Inventor: Hossein Mansouri, 8310 Wild Rose #16C, Houston, Tex. 77083

[21] Appl. No.: 810,233

[22] Filed: Mar. 3, 1997

[51] Int. Cl.⁶ ........................................ B65D 6/22
[52] U.S. Cl. .................. 220/4.31; 220/666; 220/4.16; 206/600
[58] Field of Search .................. 220/1.5, 403, 404, 220/401, 400, 6, 7, 666, 668, 408, 410, 4.33, 4.16, 4.17, 4.13, 4.12, 4.28, 4.31; 206/386, 600

[56] References Cited

U.S. PATENT DOCUMENTS

| | | | |
|---|---|---|---|
| 3,266,656 | 8/1966 | Kridle | 220/4.33 |
| 4,673,087 | 6/1987 | Webb | 220/4.33 |
| 4,715,508 | 12/1987 | Schurch | |
| 4,930,661 | 6/1990 | Voorhies | 220/403 |
| 5,031,792 | 7/1991 | Russo, Sr. | 220/403 |
| 5,253,763 | 10/1993 | Kirkley et al. | 206/600 |
| 5,419,448 | 5/1995 | Watson | 220/403 |
| 5,566,849 | 10/1996 | Goehner | 220/4.33 |

FOREIGN PATENT DOCUMENTS 2 242 891  10/1991  United Kingdom ................ 206/600

*Primary Examiner*—Stephen J. Castellano
*Attorney, Agent, or Firm*—Michael B. Jolly

[57] ABSTRACT

A reusable collapsible intermediate bulk shipping container adaptable to be used with a disposable inner fill bag, supplied in a corrugated cassette, upon a standard size pallet. The container has four interlocking wall frames with insertable wall panels forming inert interior wall surfaces, an engaging top member in addition to an easy access halfwall member provides access for positioning a standard inner fill bag drain gland. The container is easily and quickly set up or collapsed and secured upon the pallet for return shipping or reuse.

2 Claims, 2 Drawing Sheets

COLLAPSIBLE SHIPPING CONTAINER

BACKGROUND OF THE INVENTION

Numerous intermediate bulk containers have been developed for shipping liquid which are the general shape of a rectangle or a standard pallet. Many of these containers are adapted to utilize a disposable inner plastic bag, the bags are a standard size and are generally disposed after use.

The present device provides a collapsible lightweight intermediate bulk liquid shipping container which is constructed of four wall frame members with inserted wall panels which wall frames are assembled upon a standard size pallet, using the pallet as the container's floor. The container is lighter than most prior devices and constructed of durable reusable materials allowing the container to be reused and shipped in a collapsible state. Furthermore, the inner disposable bag is supplied within a cassette for easy positioning within the container.

PRIOR ART

Prior devices designed for use with plastic inner bags and which are collapsible, which are incorporated with a pallet type base, containers which are formed from injected plastic pieces and corrugated disposable containers are summarized below.

Naoki, et al., U.S. Pat. No. 5,505,323 discloses an inlockingly-assembled container with a bottom member provided with a female locking means lockingly engaged with a plurality of side members. The present invention utilizes an existing pallet for the bottom member allowing the device to be inexpensively and quickly adapted to existing equipment while also providing replaceable panels for the side wall members.

Watson, U.S. Pat. No. 5,419,448 discloses a knock down storage container comprising a base with side walls pivotally connected to the base. The present invention utilizes an existing pallet for the bottom member allowing the device to be inexpensively and quickly adapted to existing equipment also allowing for easy replacement of the pallet if damaged.

Streich, et al., U.S. Pat. No. 5,289,933 discloses a collapsible cargo container integrally designed with a bottom member and a plurality of side walls which are releasable connected to the bottom member with plug-in connectors located at the corners of the bottom member. The present invention utilizes an existing pallet for the bottom member with pallet retaining tabs on the side members allowing the device to be inexpensively and quickly positioned upon a pallet and secured with straps for shipping, allowing for adaption to existing equipment also allowing for easy replacement of the pallet if damaged, while also providing panels which are easily replaced into the side wall members.

D'Hollander, U.S. Pat. No. 5,269,414 discloses an intermediate collapsible bulk container with four sides foldablely attached to a base, the base further serving as staggered support for stacking the folded side walls flatly for reshipping the collapsed container. The present invention utilizes an existing pallet for the bottom member while pallet retaining tabs on the side members allow the device to be inexpensively and quickly positioned upon a pallet and secured with straps for shipping, allowing for adaption to existing equipment also allowing for easy replacement of the pallet if damaged. with Coogan, et al., U.S. Pat. No. 5,056, 667 discloses an improved collapsible pallet cage with four side walls pivotally attached to a bottom member with four stub corner posts, the side walls are folded and stacked similar to the 414 patent. The present invention utilizes an existing pallet for the bottom member, while pallet retaining tabs on the side members allow the device to be inexpensively and quickly positioned upon a pallet and secured with straps for shipping, allowing for adaption to existing equipment also allowing for easy replacement of the pallet if damaged.

Foy. et al., U.S. Pat. No. 4,917,255 discloses a collapsible container with side walls hingedly secured to a base. The present invention utilizes an existing pallet for the bottom member, while pallet retaining tabs on the side members allow the device to be inexpensively and quickly positioned upon a pallet and secured with straps for shipping, allowing for adaption to existing equipment also allowing for easy replacement of the pallet if damaged.

Francis, et al., U.S. Pat. No. 4,828,132 discloses a collapsible reusable container with hingedly secured wall members foldable between a bottom and top members. The present invention utilizes an existing pallet for the bottom member, while pallet retaining tabs on the side members allow the device to be inexpensively and quickly positioned upon a pallet and secured with straps for shipping, allowing for adaption to existing equipment also allowing for easy replacement of the pallet if damaged.

Ostreich, Jr., et al., U.S. Pat. No. 4,809,851 discloses a base with sides members assembled to the base with mortises and lock tenons attaching the side members to the bottom member. The present invention utilizes an existing pallet for the bottom member, while pallet retaining tabs on the side members allow the device to be inexpensively and quickly positioned upon a pallet and secured with straps for shipping, allowing for adaption to existing equipment also allowing for easy replacement of the pallet if damaged while also providing durable side panels which can be easily replaced into the side wall members if damaged.

Schurch, U.S. Pat. No. 4,715,508 discloses a rigid collapsible container with a base and upstanding corner post pivotal to a horizontal position along with four hinged side members. The present invention utilizes an existing pallet for the bottom member, while pallet retaining tabs on the side members allow the device to be inexpensively and quickly positioned upon a pallet and secured with straps for shipping, allowing for adaption to -existing equipment also allowing for easy replacement of the pallet if damaged while also providing durable side panels which can be easily replaced into the side wall members if damaged.

SUMMARY OF THE INVENTION

It is accordingly an object of the present invention to provide a collapsible cargo container comprising four upstanding sidewall frame members adapted to receive four sidewall panel members and when constructed upon a standard size pallet a top panel member, the container dimensioned to receive a plastic inner bag and further an outlet through one of the sidewalls for draining the contents of the inner bag, additionally one sidewall member being divided into a stationary lower half and an upper half allowing the upper half to be installed only after the inner bag has been placed into the container interior and correctly positioned. The container further provides an inexpensive and practical alternative to the prior art by allowing the container to be placed upon an existing pallet, pallet retaining tabs protruding downwardly from the sidewalls allows the container to be correctly positioned upon the pallet. Further more the sidewalls are constructed of lightweight frame members and an inert corrugated plastic wall panel is inserted into each sidewall member, the wall panels can be easily replaced if necessary, the overall weight of the container save shipping cost for the user.

The inventor has found that it is desirable to utilize a product which can be used with an existing pallet. This attribute provides a less expensive product and a lighter product which results in lower shipping cost, and further a container which can be used repeatedly even if the pallet is damaged since the pallet can be replaced. Furthermore the device can be shipped disassembled by simply stacking and strapping the sidewall members upon the pallet. While the devices component, such as the plastic wall panels can be replaced if damaged.

DETAILED DESCRIPTION OF THE DRAWINGS

Figure 1:
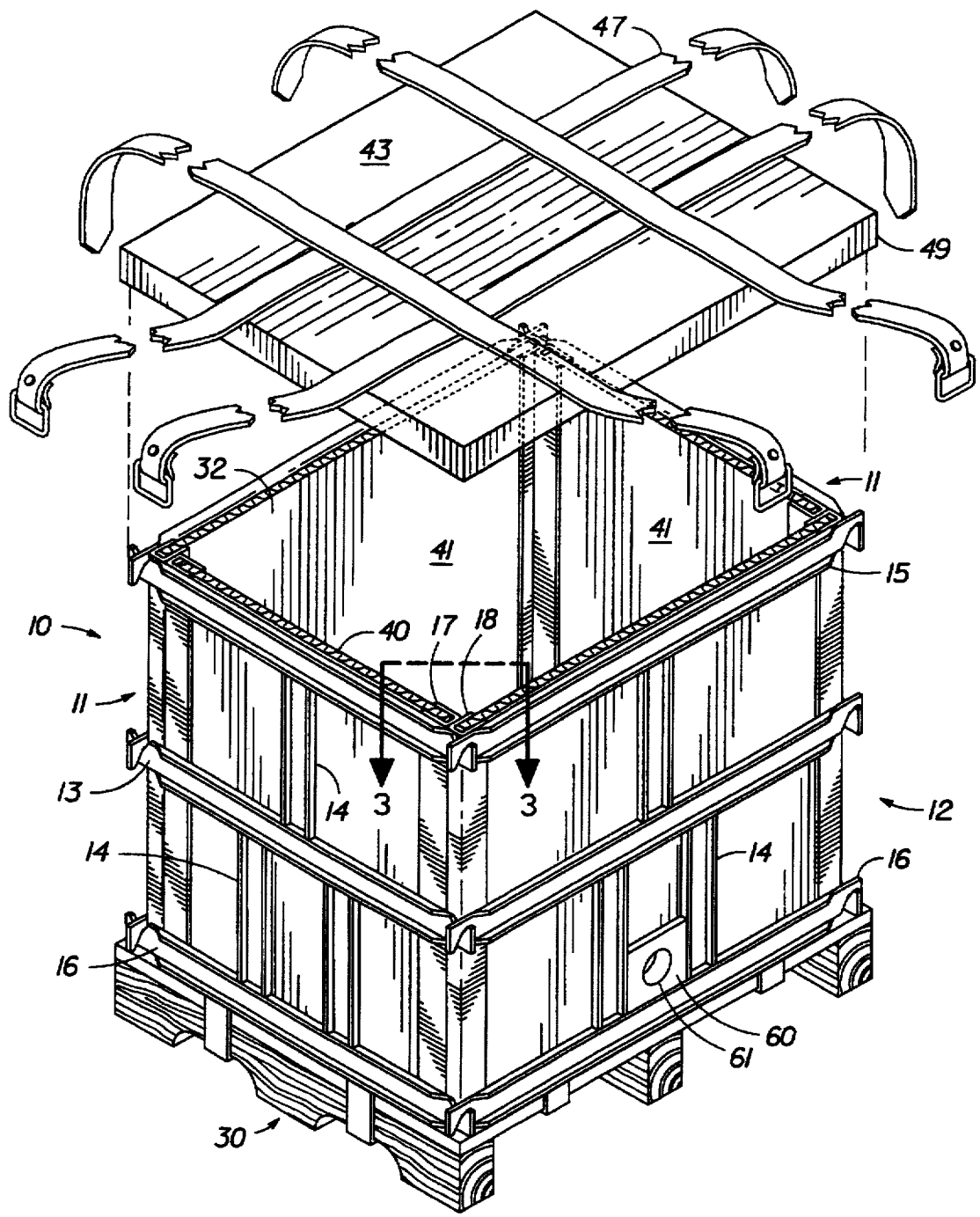
FIG. 1 is a perspective view of the collapsible container with the top removed.
Figure 2:
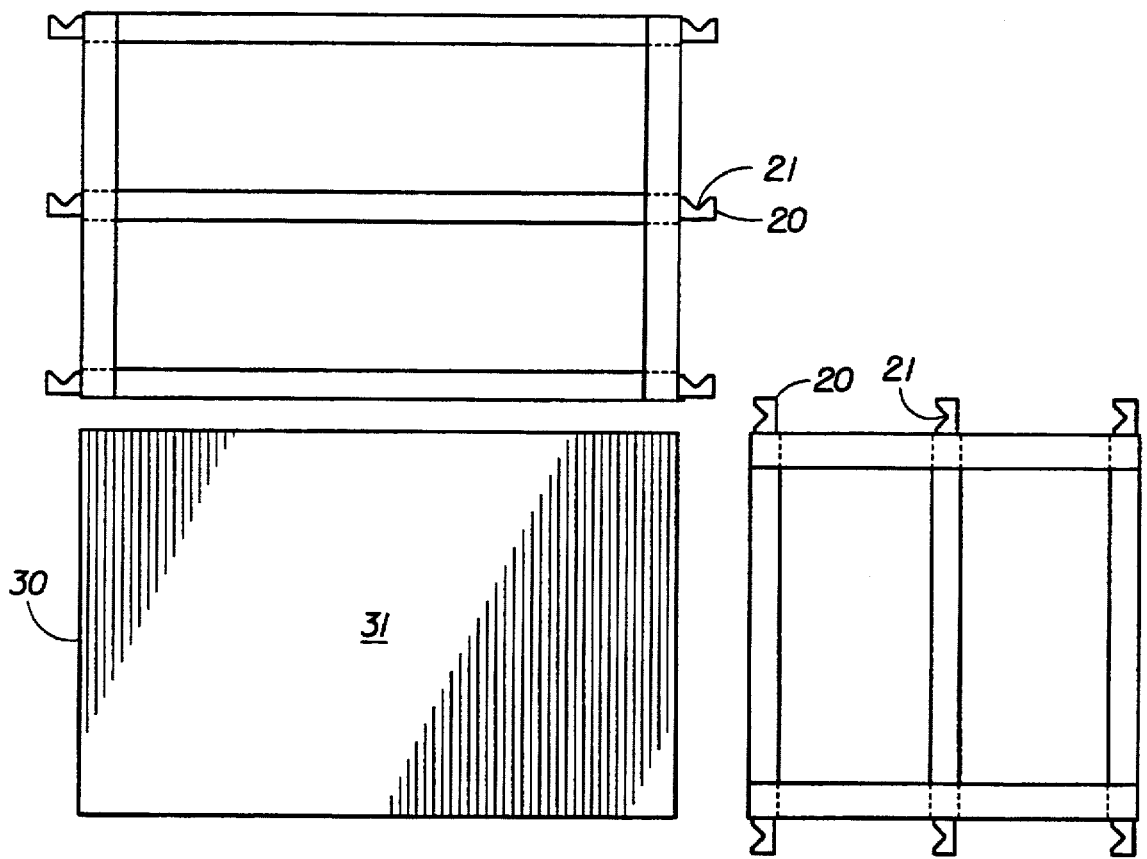
FIG. 2 is a partial disassembled view of two sidewalls illustrating the engagement means.
Figure 3:
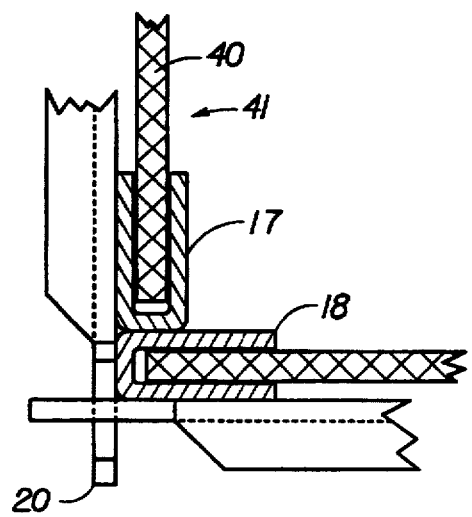
FIG. 3 is a top view of two sidewalls attached illustrating the wall panels.

Referring to the drawings the assembled container 10 sits upon a standard pallet 30, the container 10 is the general shape of a rectangle having a pair of short sidewall members 11, and a pair of long sidewall members 12. When assembled upon a standard pallet 30, the pallet 30 serves as the bottom 31 of the interior of the container 32. The standard pallet 30 is contemplated to be a rectangle forty inches by forty eight inches when measured from the pallet's outside dimension. Accordingly, the container side members length should correspond to this standard pallet size.

The container sidewall members 11, 12 are constructed of channel material in the general shape of a U. A plurality of U shaped members are integrally combined to form each sidewall member, furthermore the U shaped members are oriented in such a manner to provided, by their assemblage, sidewall members with structural integrity sufficient, when assembled, to resist deformation when product fills the container. Both the short 11 and long 12 sidewall frame members are constructed similarly, where the U shaped channel members are arranged to form a rectangle frame for each side which measures about thirty six inches high when assembled. The rectangle frame sides have a horizontal mid frame member 13 which adds additional strength to each sidewall frame and further a plurality of short vertical members 14 extending from the horizontal frame members 13 to the top 15 and bottom 16 horizontal frame members. All the sidewall members 11, 12 have a pair of long vertical edges 17 forming the outside rectangle edge. Similar to the other frame members the long vertical edges 17 are shaped like a U while the open part of the U faces the opposing vertical edge U on that side member, and further faces the interior 32 of the container, when viewing the vertical edges from the top. This arrangement of the long vertical edges 17 forms receiving channels 18 for a side panel member 40 to be slid into each side frame member, the side panel members 40 then providing an interior surface 41 exposed to the cargo space of the container. The horizontal top edge 15, horizontal mid frame member 13, and the horizontal bottom edge 16 are dimensioned similarly for each pair of side members. Additionally, the horizontal members are constructed of U shaped channel material with flat end portions 20 of the horizontal members which flat end sections 20 extend beyond the vertical side members 17 about one inch two about two inches. The flattened portion 20 of the horizontal members forms engagement tabs 20 for lockingly engaging the side members to each other when assembling the container. The engagement tabs 20 have engagement V notches 21 which are cut through approximately half of each tab, and further the notches 21 are oriented the same for each short sidewall frame and oppositely for each long sidewall frame. This opposite positioning of the V notches from the short and long sidewall members provides a means for quickly engaging the side panel members during assemble of the container. To assemble the sidewall members a short sidewall member edge 17 is placed next to a long sidewall member edge 17 and oriented forming a 90° angle between the two sidewall members, which positions the V notches open towards one another and perpendicular to one another. The V notches are then engaged by bringing the side frame members top and bottom edges into alignment with each other while engaging the oppositely and perpendicularly positioned V notches.

The wall panels 40 are most preferable constructed of corrugated plastic of about one quarter to about one half inch thick. The use of corrugated plastic provides a durable material which will not degrade in the presence of moisture from the cargo sweating or from other sources of moisture. Prior devices which use corrugated paper products for wall panels have limited life spans when exposed to moisture, this problem is solved by the use of the plastic corrugated material. Furthermore the framed sidewalls provides a means for utilizing the plastic panels since the sidewall panels include the panel receiving channel 18.

Top panel 43 is to be placed into position after assembling and filling the container. The top panel is supplied as a flat piece of corrugated plastic with scored lines allowing the panels edges to be bent to form a skirted edge to form a cap top panel with edges which skirt around the exterior of the container's top edge. The dimensions of the top cap panel should allow the cap to fit around the outside of the assembled container top edge. Four straps 47 are provided, two of which wrap around the top, container, and pallet in one direction while the other two straps wrap around the top, container, and pallet crossing the other two straps thereby securing the cargo for shipping.

One sidewall may provide easy access to the container interior 32 by having a split sidewall wherein one half of the sidewall is installed allowing access into the interior 32 for positioning the inner bag. After the inner bag is partially filled the upper half of the sidewall may be installed for completing the filling process. The bag also has a spout for draining the contents from the container.

It is desirable to provide an inner plastic bag supplied in a corrugated cassette, which cassette is dimensioned to fit within the container's interior and lay flatly on the container's pallet surface floor. The use of this type of cassette plastic bag prevents creases from forming in the inner plastic bag while filling the bag with cargo.

In order to protect the inner bag spout 61, which extends about one inch from a sidewall lower area near the pallet, a protective housing 60 which extends about one inch to about two inches from the sidewall frame. The housing is most preferable positioned between two vertical members 14 and constructed of heavy gauge sheet metal about one sixteenth to about one eight inch thick. The protective housing 60 should not protrude from the sidewall frame far enough to cause a hazard.

I claim:

1. A reusable collapsible intermediate bulk shipping container adaptable to receive an inner fill bag supplied in a corrugated cassette, comprising;

a) a standard size pallet forming an interior floor of the container, said pallet having a length of about 48 inches and a width of about 40 inches, b) four interlocking sidewall frame members with wall panel receiving channels, said sidewall frame members interlocking to form a rectangle enclosure with an open top, the rectangle enclosure resting upon said pallet, said sidewall frame members including a plurality of horizontal structural frame members aligned and securely attached to said sidewall frame members to form a lightweight frame structure in conjunction with said sidewall frame members, each of the ends of said horizontal structural frame members includes an engaging tab extending planarly therefrom, each engaging tab having uniformly positioned V-shaped notches, the notches on two adjacent ends of two adjacent horizontal structural frame members being oriented oppositely and perpendicularly to one another so that the notches lockingly engage each other when the notches are aligned and said sidewall frame members are positioned upon said pallet, said sidewall frame members having pallet alignment tabs which are integral with said sidewall frame members and extend from each sidewall frame member to align and maintain the assembled sidewall frame members upon said pallet, one of said sidewall frame members having an aperture providing an outlet means for an inner fill bag drain gland positioned near the container interior floor, c) wall panels disposed within said wall panel receiving channels of the sidewall frame members, said wall panels forming an interior surface of the container, whereby the inner fill bag corrugated cassette is adapted to be disposed within said rectangular enclosure and upon the interior floor of the container formed by the pallet, said wall panels having a height of about 36 inches, d) a top panel disposed upon the open top of the container, said top panel having skirted edges around the perimeter of the top panel forming a top cap of the assembled container with said skirted edges laying on the exterior of the container, and e) a plurality of straps positioned around the top cap, sidewall frame members, wall panels and pallet, which secures the top to the open top and the wall panels and sidewall frame members upon the pallet.

2. The collapsible container as set forth in claim 1 wherein one of said wall panels further comprises a two piece wall comprising a lower half installed upon the pallet and an upper half installed upon the lower half, installation of the lower half wall allowing access to the container prior to and during a container filling procedure and while the upper half is installed to complete the filling operation or removed to assist in a container unloading operation.

* * * * *